(12) United States Patent
O'Brien et al.

(10) Patent No.: US 7,698,275 B2
(45) Date of Patent: Apr. 13, 2010

(54) SYSTEM AND METHOD FOR PROVIDING REMEDIATION MANAGEMENT

(75) Inventors: Darci O'Brien, Kansas City, MO (US);
John Giubileo, Shawnee, KS (US);
David C. Rankin, Shawnee, KS (US)

(73) Assignee: Computer Associates Think, Inc., Islandia, NY (US)

( * ) Notice: Subject to any disclaimer, the term of this patent is extended or adjusted under 35 U.S.C. 154(b) by 917 days.

(21) Appl. No.: 11/133,958

(22) Filed: May 20, 2005

(65) Prior Publication Data

US 2006/0010497 A1    Jan. 12, 2006

Related U.S. Application Data

(60) Provisional application No. 60/573,056, filed on May 21, 2004.

(51) Int. Cl.
*G06F 7/00* (2006.01)
*G06F 17/30* (2006.01)

(52) U.S. Cl. .............................. 707/9; 707/10
(58) Field of Classification Search .............. 707/9, 707/10
See application file for complete search history.

(56) References Cited

U.S. PATENT DOCUMENTS

| | | | |
|---|---|---|---|
| 5,931,946 A | 8/1999 | Terada et al. | |
| 6,279,113 B1 | 8/2001 | Vaidya | |
| 6,298,445 B1 | 10/2001 | Shostack et al. | |
| 6,324,656 B1 | 11/2001 | Gleichauf et al. | |
| 6,775,657 B1 | 8/2004 | Baker | |
| 2002/0026591 A1 | 2/2002 | Hartley et al. | |
| 2002/0055912 A1* | 5/2002 | Buck ........................... | 705/76 |
| 2002/0178383 A1* | 11/2002 | Hrabik et al. ................ | 713/201 |
| 2003/0055994 A1* | 3/2003 | Herrmann et al. ........... | 709/229 |
| 2003/0081621 A1* | 5/2003 | Godfrey et al. ............. | 370/400 |
| 2003/0110280 A1* | 6/2003 | Hinchliffe et al. ........... | 709/232 |
| 2003/0126472 A1 | 7/2003 | Banzhof | |
| 2003/0135749 A1 | 7/2003 | Gales et al. | |
| 2003/0233438 A1 | 12/2003 | Hutchinson et al. ......... | 709/223 |
| 2005/0005162 A1 | 1/2005 | Oliphant | |
| 2005/0015622 A1 | 1/2005 | Williams et al. | |
| 2005/0022021 A1 | 1/2005 | Bardsley et al. | |

FOREIGN PATENT DOCUMENTS

| WO | WO 99/56195 | 11/1999 |
|---|---|---|
| WO | WO 03/107211 | 12/2003 |

* cited by examiner

*Primary Examiner*—Hosain T Alam
*Assistant Examiner*—Van H Ngo
(74) *Attorney, Agent, or Firm*—Pillsbury Winthrop Shaw Pittman LLP

(57) ABSTRACT

In one embodiment, software for remediation management is operable to automatically identify an asset in an enterprise network. One or more vulnerabilities of the identified asset is automatically identified based on comparing the identified asset to content associated with the one or more vulnerabilities. At least a portion of the content is collected from a plurality of third party content providers. Other example software for remediation management may be operable to identify one or more vulnerabilities of an asset based on comparing the asset to content associated with the one or more vulnerabilities and automatically generate remediations for the asset based on the content associated with the one or more vulnerabilities.

34 Claims, 5 Drawing Sheets

| Select All | Status | Rank | Remediation | Type | Risk | Associated Context ID | Assets | Asset Groups |
|---|---|---|---|---|---|---|---|---|
| 304 ☐ | Open | 87 | Patch 857658 | Vendor Provided | High Med Low | 46937, 2388, 6866, 9834, ... 900089, 1234 00034 | 27 18 9 | Group One, Group Two, Group Three, Another Group, Many groups, Last Group |
| 304 ☐ | Open | 75 | CS9888 | Admin Provided | High Med Low | 66666, 9823, 121212 030303, 98765 55555, 323, 4545, 32090, ... | 19 9 7 | Group Four, Group Two, Group Three, Groups, Groups |
| | In Process guertwe | 62 | Patch 90909 Patch 55003 | Vendor Provided | High Med Low | 5050, 9823, 34343 777, 888, 212 0000, 9898, 1111, 8989, ... | 22 10 5 | Group One, Group Five, Group Eight, Group Six, Another, Another, Another |

Export Report  Print Report
First Previous <<1 2 3>> Next Last

Showing Results: 1 to 3 of 3

Remediation Action:
318 — Send to SD Queue ▼

Global Notes: Global Notes apply to all selected tasks and can be added with or without applying a Remediation. Clicking Save will apply the action selected and append the note.

Save

*Vulnerability Remediation Task Detail* — Back to Task List

402 Remediation Name: | Path: 857658
- Type: Vendor Provided
- Rank: 75
- Technologies: Windows 2000 Advanced Svr SP2 Windows 2000 Advanced Server SP3 Windows 2000 Advanced Server SP4 — 410
- Implementation: http://www.microsoft.com/technet/security/bulletin/MS03-030.asp — 412
  *This reflects the remediation profile.*

404 Affected Assets - Select assets and/or groups to update.

Select All
+ ☐ Bldg. 201 (2 assets)
− ☐ Group One (6 assets)
  ☐ D1503
  ☐ D1504
  ☐ D1505
  ☐ D1506
  ☐ D1507
  ☐ D1508
+ ☐ Johns Group (12 assets)

406 Remediation Action: [Send to SD Queue ▾]
Notes: [                ]
[Save]

414 Vulnerabilities Fixed By This Remediation

| Vuln ID(s) Click Link to Status the Vulnerability | Risk | Description - Click link to see Vuln Detail |
|---|---|---|
| 6815 | High | Microsoft Windows DirectX DirectShow MIDI buffer overflow vulnerability |
| 99834 | Med | Microsoft Windows WM_TIMER message privilege escalation vulnerability |
| 050505 | Low | Microsoft Windows Accessibility Utility Manager Windows Message handling vulnerability |

400

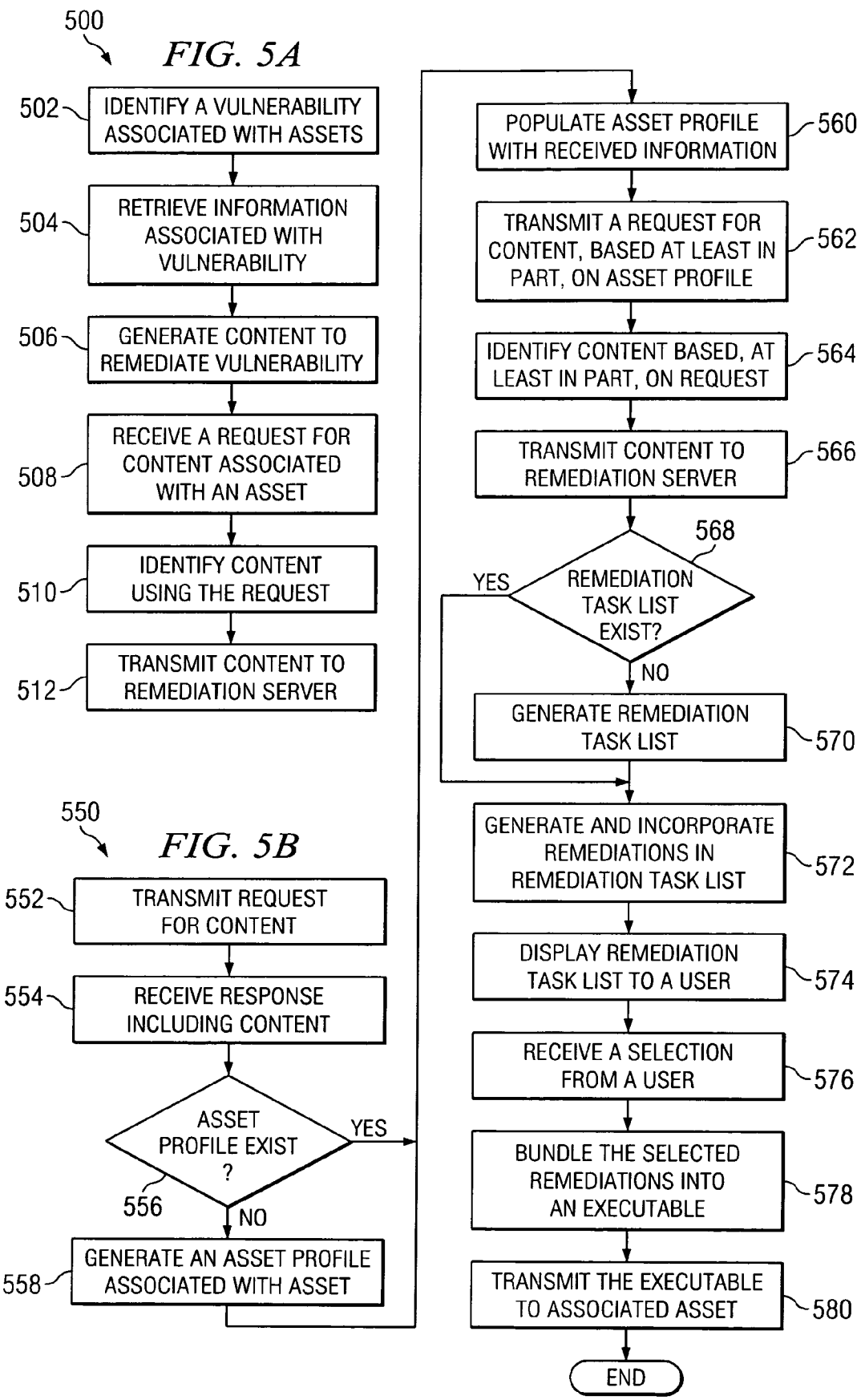

SYSTEM AND METHOD FOR PROVIDING REMEDIATION MANAGEMENT

RELATED APPLICATION

This application claims the benefit of U.S. Provisional Application No. 60/573,056 filed May 21, 2004.

TECHNICAL FIELD

This invention relates to asset management and, more particularly, to a system and method for providing remediation management.

BACKGROUND

Managing computer information and/or network security in an enterprise network can be challenging and is generally fundamental to the overall success of the enterprise. The effect of a security incident can vary depending on its severity and the nature of the attack or the compromised system. Examples are loss from fraud, theft of information, disruption of service, unauthorized use of resources, loss of customer confidence, and brand erosion. Maintaining an effective system for mitigating vulnerabilities of an enterprise network, however, can be difficult due to a changing nature of security threats, shortages of information component (IT) resources, lack of security awareness, implementation difficulties, and other issues.

SUMMARY

In one embodiment, software for remediation management is operable to automatically identify an asset in an enterprise network. One or more vulnerabilities of the identified asset is automatically identified based on comparing the identified asset to content associated with the one or more vulnerabilities. At least a portion of the content is collected from a plurality of third party content providers. In another alterative or complementary embodiment, software for remediation management may be operable to identify one or more vulnerabilities of an asset based on comparing the asset to content associated with the one or more vulnerabilities and automatically generate remediations for the asset based on the content associated with the one or more vulnerabilities.

DESCRIPTION OF DRAWINGS

FIG. 3 illustrates an exemplary display presenting a remediation task list in accordance with one embodiment of the present disclosure;

FIG. 4 illustrates an exemplary display presenting a vulnerability remediation task detail in accordance with one embodiment of the present disclosure;

FIG. 5A is a flow diagram illustrating an example method for managing content for one or more enterprise networks; and FIG. 5B is a flow diagram illustrating an example method for managing remediations in an enterprise network.

DETAILED DESCRIPTION

Figure 1:
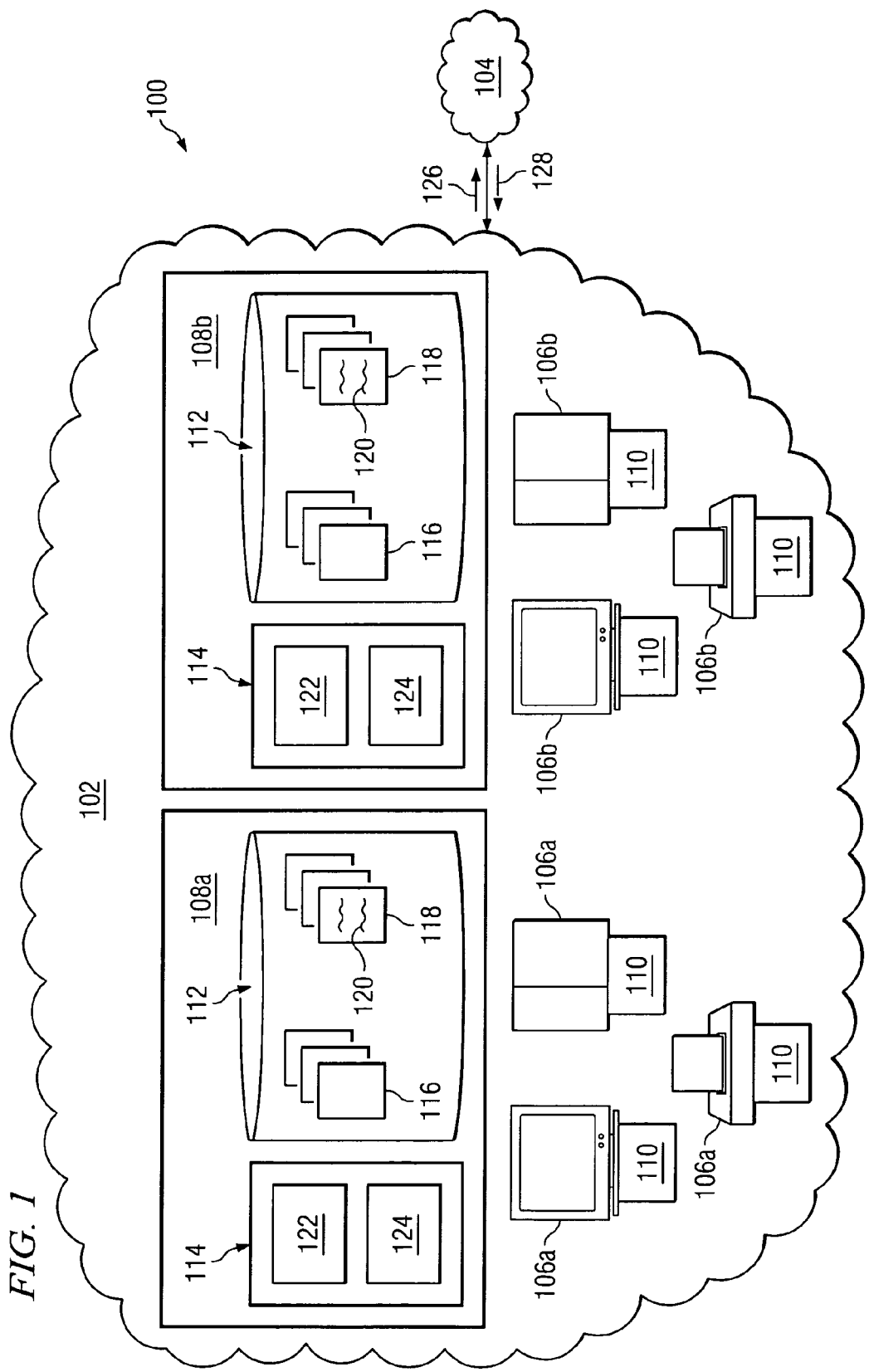
FIG. 1 is a block diagram illustrating a remediation management system in accordance with one embodiment of the present disclosure.

FIG. 1 illustrates a system 100 for managing remediations of assets 106 in an enterprise network 102. Assets 106 comprise computing devices managed, controlled, included in, or otherwise associated with enterprise network 102. As used herein, a remediation may be any component or technique operable to upgrade, repair, restore, or otherwise update one or more assets 106 in enterprise network 102. For example, a remediation may include a patch, a release, a configuration-setting script, manual instructions, or any other suitable directive. At a high level, system 100 is all or a portion of a distributed environment comprising enterprise network 102 and a plurality of assets. In general, system 100 is operable to update assets 106 in enterprise network 102. For example, system 100 may be an enterprise management system operable to automatically provide a remediation to an asset 106 in response to identifying a vulnerability of the particular asset 106. The term "automatically," as used herein, generally means that the appropriate processing is substantially performed by system 100. It should be understood that automatically further contemplates any suitable user interaction with system 100. A vulnerability of asset 106 is a flaw, weakness, or older version of hardware, software, or firmware that may prevent asset 106 from operating correctly, may be exploited to gain unauthorized access to information, may interfere with the operation of the particular asset 106, or does not include as many features or improved features as a later release. As a result, system 100 may automate the mitigation of vulnerabilities (as compared to manual mitigation) in enterprise network 102 thereby resulting in a more secure networking environment. Indeed, system 100 may allow the enterprise to reduce costs and time of network or asset administration by proactively patching or updating a number of assets 106 in enterprise network 102 quickly.

Enterprise network 102 is a network associated with an enterprise. The enterprise may comprise a corporate or business entity, a government body, a non-profit institution, or any other organization with a plurality of assets 106. The enterprise may be the owner of assets 106. Of course, the enterprise may also lease assets 106 or may hire contractors or agents who are responsible for maintaining, configuring, controlling, and/or managing assets 106. In one embodiment, the enterprise manages the remediation of vulnerabilities through enterprise network 102. For example, the enterprise may distribute a patch for updating or remediating an application running in enterprise network 102. In the illustrated embodiment, enterprise network 102 facilitates wireless and/or wireline communication between assets 106 and remediation servers 108. Enterprise network 102 may communicate, for example, Internet Protocol (IP) packets, Frame Relay frames, Asynchronous Transfer Mode (ATM) cells, voice, video, data, and other suitable information between network addresses. In addition, while enterprise network 102 is illustrated as a single network, enterprise network 102 may comprise a plurality of networks. In short, enterprise network 102 is any suitable network that includes assets 106 and remediation servers 108.

As described above, assets 106 comprise devices associated with the enterprise and may include computers, switches, servers, routers, printers, data storage devices, a personal computer, a workstation, network computer, kiosk, wireless data port, personal data assistant (PDA), telephones, one or more processors within these or other devices, or any other suitable processing device. Each asset 106 may be associated with a group and/or an individual within the enterprise. For example, a group of assets 106 may be associated with a corporate department (e.g., accounting, marketing, research and development), a geographic or network (sub-net) region (e.g., United States, Europe), a location (e.g., building, floor in building), a customized group (e.g., "John's Group"), or any other suitable categorization of assets 106. In addition, groups of assets 106 may be associated with a specific remediation server 108. For example, assets 106*a* and assets 106*b* may be associated with remediation server 108*a* and remediation server 108*b*, respectively. Each asset 106 executes, references, includes, or is otherwise associated with software, hardware, firmware, a combination of the foregoing or other component of asset 106. For example, the component may be an application running on an asset 106 such as, for example, a web browser, an operating system, a word-processing application, or any other suitable program. In another example, the component may also comprise a database, a peripheral, a network or hardware device (e.g., memory, printer, external hard drive, switch, router, hub, modem, other). As used herein, "asset 106" and "component of asset 106" may be used interchangeably as appropriate. As discussed above, asset 106 may include a vulnerability that, for example, interferes with the operation of the associated asset 106 or poses a security risk. Returning to the patch example, a web browser executed by or included in asset 106 may include a defect in security operations allowing financial information to be illicitly disclosed during a transaction and, thus, requiring a patch or other remediation. Typically, assets 106 receive remediations from one or more remediation servers 108. In the illustrated embodiment, such remediations are received, processed, and executed by an agent 110.

Agent 110 is typically software and may be written or described in any appropriate computer language including, for example, C, C++, Java, J#, Visual Basic, assembler, Perl, any suitable version of 4 GL, or any combination thereof. As used herein, software generally includes any appropriate combination of software, firmware, hardware, and/or other logic. Agent 110 is communicably coupled with remediation server 108. For example, agent 110 may be operable to transmit information identifying components and/or configuration settings of the associated asset 106 to remediation server 108. As a result, the transmitted information may identify (or be used to identify) vulnerabilities of the associated asset 106. In the patch example, agent 110 may transmit information identifying a version of the web browser, indicating that the web browser has not been updated to remediate the security defect. In one embodiment, agent 110 receives a request to identify a component and/or configuration settings of an associated asset 106. In response to the request and/or upon entry of asset 106 to enterprise network 102, agent 110 determines or otherwise identifies the component and/or configuration settings of an associated asset 106 and transmits this information to the associated remediation server 108. More particularly, agent 110 may identify some or all components, some or all configuration settings, a version, a component that has changed since a prior request, configuration settings that have changed since a prior request, a new component since a prior request, a new configuration setting since a prior request, a new version since a prior request, an installed patch, a manual fix, a combination of the foregoing, or any other suitable information. Alternatively or in combination, agent 110 may periodically (e.g., 12 hrs., 1 day, 1 week, 1 month, 6 months) poll components and/or configuration settings of associated asset 106 and automatically transmit the information indicating the results to an associated remediation server 108.

Further, agent 110 may be operable to receive remediations from server 108 and automatically install the received remediation. The installation may occur without interaction of a user of the associated asset 106 and may not allow the user to contradict or reschedule the remediation. In one embodiment, agent 110 notifies the user that the update is about to occur using a remediation and/or that the update was successfully completed. In another embodiment, agent 110 may operate hidden from the user. Agent 110 may be written in or based on any appropriate computer language including C, C++, Java, Visual Basic, Perl, and others. In one embodiment, agent 110 is implemented as a daemon or other process. It will be understood that while agent 110 is illustrated as a single multi-tasked module, the features and functionality performed by this engine may be performed by multiple modules. Moreover, agent 110 may comprise a child or submodule of another software module, such as inventory module 122 and/or remediation module 124, without departing from the scope of this disclosure.

Returning to enterprise network 102, each server 108 is a computer that provide remediations to associated assets 106. In one embodiment, each server 108 is operable to manage up to 10,000 assets 106. Each server 108 may be configured to manage other servers 108 and may automatically communicate and manage updates to the other servers 108 for other portions of enterprise network 102. In the illustrated embodiment, server 202 includes memory 112 and a processor 114 and comprises an electronic computing device operable to receive, transmit, process and store data associated with system 100. Although FIG. 1 provides one example of server 108 that may be used with the disclosure, server 108 can be implemented using computers other than servers, as well as a server pool. For example, server 108 may comprise a general-purpose personal computer (PC), a Macintosh, a workstation, a UNIX-based computer, a blade server, or any other suitable device. Server 108 may also comprise or include a web server. Server 108 may be adapted to execute any operating system including UNIX, Linux, Windows Server, Z/OS, or any other suitable operating system. In one embodiment, server 108 does not allow direct access from an administrator or other user, but instead requires the administrator to securely log on through a standard web interface, such as a web browser. For example, each server 108 may include only one application-specific open port. Once the administrator logs in, he may be presented with an interface using the web interface. This interface (as illustrated in example FIGS. 3 & 4) generally provides summary information including downloaded content and assessed vulnerabilities and remediations.

In summary, server 108 may comprise software and/or hardware in any combination suitable to update or distribute updates to one or more assets 106. For example, server 108 may provide a patch operable to remediate (or update) a security vulnerability of a software program running on a particular asset 106.

Memory 112 may include any memory or database module and may take the form of volatile or non-volatile memory including, without limitation, magnetic media, optical media, random-access memory (RAM), read-only memory (ROM), removable media, or any other suitable local or remote memory component. In this embodiment, memory 112 includes asset profiles 116 and remediation task lists 118, but may also include any other appropriate files or data. Asset profiles 116 includes one or more entries or data structures that describes a profile of an asset 106 and/or a group of assets 106. For example, an asset profile 116 may include, indicate, or reference one or more of the following: an asset name, an asset ID, an asset type, an associated group name, a manufacturer name, a model name, a component name, a component version, a configuration setting, a building name, a geographic location, networking information, previously implemented remediations, and/or any other suitable information used to identify one or more vulnerabilities of the associated asset 106 and/or group. Returning to the patch example, asset profile 116 may identify a name of the web browser and version associated with a specific asset 106. In addition, asset profile 116 may be associated with an individual and/or group of assets 106. Asset profiles 116 may be stored in any suitable format such as, for example, an eXtensible Markup Language (XML) document, a flat file, comma separated value (CSV) file, a name-value pair file, SQL table, or others. Indeed, each profile 116 may be a temporary or a persistent data structure without departing from the scope of the disclosure. Asset profiles 116 are typically generated or loaded based on data or other configuration information received or retrieved from agent 110. But asset profiles 116 may also be created, updated, or supplied by server 108, a third-party software vendor, or any appropriate user of any computer in system 100, loaded from a default profile, or received via network 102 or 104.

Based, at least in part, on asset profile 116, remediation task list 118 associates remediations 120 to a specific asset 106 and/or group of assets 106. For example, remediation task list 118 may include a plurality of remediations 120 for automatically fixing vulnerabilities or complying with configuration standards. In the patch example, remediation task list 118 may associate a remediation 120 with one of the computers running the vulnerable web browser. In addition, remediation task list 118 may include one or more of the following: a name or identifier of a vulnerability, a description of a vulnerability, a vulnerability type, a vulnerability risk rating, a vulnerability indicator, an overall vulnerability risk rating of an asset 106, a remediation type, a remediation name, asset groups, or any other suitable information. Remediation task list 118 may be any suitable format such as, for example, a web page, an XML document, a flat file, CSV file, a name-value pair file, SQL table, or others. Further, remediation task list 118 may be written in or based on any appropriate computer language including C, C++, Java, Visual Basic, HTML, Perl, and others. In summary, remediation task list 118 presents or includes one or more remediations 120 for distribution to the appropriate assets 106. Each remediation 120 includes any rules, instructions, algorithms, code, or any other directives operable to update an associated asset 106. For example, remediation 120 may include code that fixes, eliminates, minimizes, or otherwise addresses one or more vulnerabilities of an asset 106 and/or a component of an asset 106. In the patch example, remediation 120 includes a patch operable to inserts object code into the executable of the web browser in order to fix the security flaw.

Returning to server 108, illustrated server 108 also includes processor 114. Processor 114 executes instructions and manipulates data to perform the operations of server 202 such as, for example, a CPU, an ASIC or a FPGA. Although FIG. 1 illustrates a single processor 114 in server 108, multiple processors 114 may be used according to particular needs and reference to processor 114 is meant to include multiple processors 114 where applicable. Illustrated processor 114 executes software, such as example inventory module 122 and remediation module 124. As with other disclosed example software, inventory module 122 is any software, hardware, firmware, or combination thereof operable to identify assets 106 in enterprise 102. For example, inventory module 122 may receive information associated with assets 106 and automatically generate and/or update asset profiles 116 based, at least in part, on the received information. In one embodiment, inventory module 122 transmits requests or queries to agents 110 of a specific asset or group of assets 106. In addition, inventory module 122 processes data collected from agent 110 and changes or otherwise modifies the associated asset profile 116. In addition, inventory module 122 may associate two or more assets 106 into an asset groups such as, for example, "user," "management," "administrator," "Unix servers," and other groups such as those previously identified. In connection with modifying an asset profile 116, inventory module 122 may communicate information to remediation module 124 indicating a modification of an asset profile 116. For example, inventory module 122 may communicate information identifying a specific asset 106 and/or the modified asset profile 116. Inventory module 122 may be written in or based on any appropriate computer language including C, C++, Java, Visual Basic, Perl, and others.

Remediation module 124 can include any software operable to identify one or more vulnerabilities of assets 106 based, at least in part, on asset profiles 116 and gathered content. Content is any rules, instructions, algorithms, code, files, or any executable that identifies one or more vulnerabilities of enterprise network 102. Remediation module 124 may transmit a content request 126 to network 104 for content associated with one or more vulnerabilities or assets 106. Content request 126 includes information that identifies assets 106, components of assets 106, versions, configuration settings, or any other suitable information that may be used to identify content associated with one or more vulnerabilities of enterprise network 102. Content request may also query network 104 for all available content that may be dynamically or subsequently filtered as appropriate. In one embodiment, remediation module 124 retrieves information associated with an asset 106 or group of assets 106 from an asset profile 116 for including in content request 126. Remediation module 124 may retrieve this information in response to communications from inventory module 122 or on a schedule. In response to receiving a content response 128 including content, remediation module 124 may compare the received content to asset profiles 116 for identifying one or more vulnerabilities of an asset 106. In response to associating content with a particular vulnerability of one or more assets 106, remediation module 124 generates a remediation 120 and often generates and/or modifies a remediation task list 118 for use by the administrator.

Additionally, remediation module 124 may automatically update an asset 106 based, at least in part, on associated remediations 120. For example, remediation module 124 may automatically bundle remediations into an executable and transmit the executable to the associated asset 106. Remediation module 124 may automatically transmit the one or more remediations 120 in response to a selection by a user, vulnerabilities associated with asset 106 or asset group 120 exceeding a risk threshold, a predetermined time, or any other suitable event. Remediation module 124 may be written in or based on any appropriate computer language including C, C++, Java, Visual Basic, Perl, and others. It will be understood that while inventory module 122 and remediation module 124 are each illustrated as single multi-tasked modules, the features and functionality performed by these engines may be performed by one combined application. Moreover, while not illustrated, inventory module 122 and remediation module 124 may each comprise a child module of another software application.

Network 104 facilitates wireless or wireline communication between the enterprise and any other computer or network. Network 104 may communicate, for example, Internet Protocol (IP) packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), all or a portion of the global computer network known as the Internet, and/or any other communication system or systems at one or more locations.

In one aspect of operation, agent 110 transmits configuration information identifying an asset 106, components of asset 106, and/or other configuration settings or software, or library, or firmware versions of asset 106 to inventory module 122. Inventory module 122 modifies a particular asset profile 116 associated with asset 106 using the received information. Of course, if profile 116 is temporary or does not exist, then inventory module 122 may generate the profile 116 using any suitable technique. In addition, inventory module 122 communicates an indication of this modification or asset profile 116 to remediation module 124. At any appropriate time, remediation module 124 transmits a content request 126 to network 104 for content, typically tailored for assets in enterprise network 102. Using gathered content, remediation module 124 identifies one or more vulnerabilities of an asset 106 based on comparing the received content with asset profiles 116. In response to the identification, remediation module 124 generates remediations 120 for the associated asset 106 and adds remediation 120 to remediation task list 118. When desired, remediation module 124 combines or bundles one or more remediations 120 of the associated remediation task list 118 into one update package. The bundled remediations 120 are then communicated to the one or more appropriate assets 106 at any time and, as appropriate, automatically installed.

Figure 2:
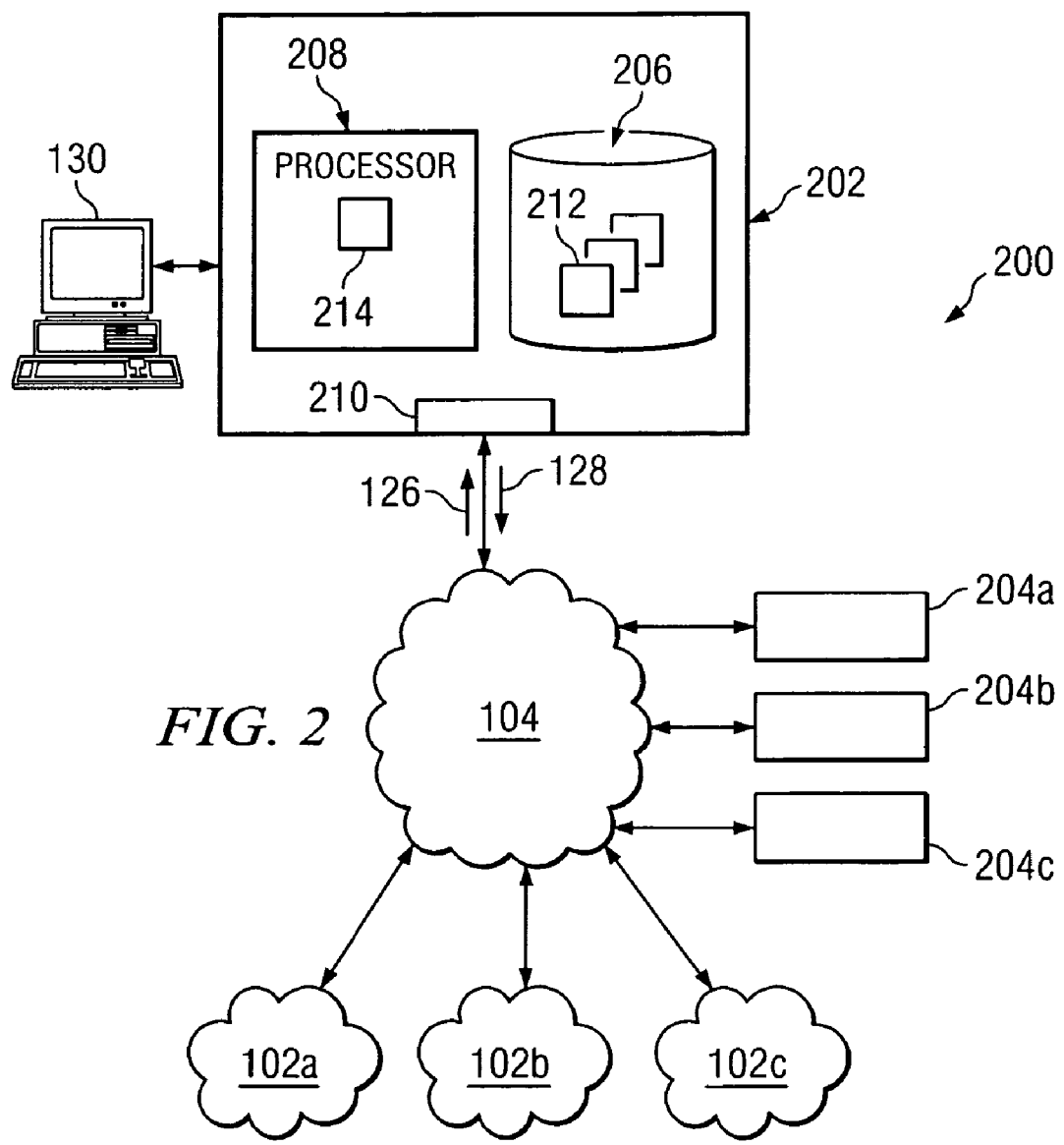
FIG. 2 is a block diagram illustrating a content management system in accordance with one embodiment of the present disclosure.

FIG. 2 illustrates a system 200 for managing content for one or more enterprise networks 102a-c. As described above, content identifies or otherwise associated with one or more vulnerabilities of enterprise network 102 and may be operable to remediate the one or more vulnerabilities. For example, content may include or identify a patch, a release, a script, a configuration setting, manual instructions, or other directives. In another example, content may identify a particular vulnerability and, based on this content, a user of system 200 may generate code operable to remediate the vulnerability. At a high level, system 200 is a distributed environment comprising content management server 202 and content providers 204. Content management server 202 is connected to content providers 204a-c and enterprise networks 102a-c through network 104. In general, system 200 is operable to provide content to one or more local or remote enterprise networks 102a-c. For example, system 200 may be an enterprise management system operable to collect proprietary and third-party content at content management server 202 and automatically transmit content to enterprise networks 102a-c in response to a request. As a result, system 200 may provide a central repository for content associated with vulnerabilities of enterprise networks 102a-c, thereby facilitating the remediation management of enterprise networks 102a-c.

Server 202 is typically a computer that transmits content to enterprise networks 102a-c in response to requests. In the illustrated embodiment, server 202 includes memory 206, processor 208, and network interface 210 and comprises an electronic computing device operable to receive, transmit, process and store data associated with system 100. In the patch example, server 202 provides a patch operable to remediate a security vulnerability of a software program running in enterprise networks 102a-c. Memory 206 may include any memory or database module and may take the form of volatile or non-volatile memory including any suitable local or remote memory component. In this embodiment, memory 124 includes content 212, but may also include any other appropriate files. Content 212 typically comprises rules, instructions, algorithms, code, or any other directives operable to identify or remediate an associated one or more vulnerabilities of an asset 106. Content 212 may comprise a script, a cyclical release, a link, a patch, a URL, a file, a configuration-setting script, or any other suitable content operable to update an asset 106 and/or component associated with an asset 106. For example, content 212 may include a patch to an operating system, updated virus or spam signature, identify a kernel setting to be changed, determine that firmware should be updated, or any other remediation measure that may be implemented or executed. It will be understood that content 212 may include content received from content providers 204, as well as include locally generated content. Content 212 may be any suitable format such as, for example, an XML document, a flat file, CSV file, a name-value pair file, an SQL table, an HTML page, a text message, or others. In addition, content 212 may be written in or based on any appropriate computer language including C, C++, Java, Visual Basic, Perl, and others.

Illustrated server 202 also includes one or more processor 208. Processor 208 executes instructions and manipulates data to perform the operations of server 202 such as, for example, a CPU, an ASIC or a FPGA. In the embodiment illustrated, server 202 includes vulnerability module 214. Vulnerability module 214 is any hardware, software, firmware, or combination thereof (collectively "software") operable to download content from content providers 204, process requests from enterprise networks 102, and automatically transmit content to enterprise networks 102a-c. For example, vulnerability module 214 may transmit requests to content providers 204 for content associated with one or more vulnerabilities. In another example, content providers may independently provide this information to vulnerability module 214. In response to receiving a content request 126, vulnerability module 214 identifies content 212 based on any appropriate criteria. For example, content request 126 may identify desired content 212 based on one or more of the following: an asset name, an asset type, a component name, an application ID, a version, an authentication ID (such as a license key and unit ID or other encryption technique), language, a message type, last message number, content version, content version change, a vender name, a date, a model name, a combination of the foregoing, or any other suitable criteria. After identifying content 212, vulnerability module 214 transmits a content response 128 to the requesting enterprise network 102. In certain embodiments, vulnerability module 214 automatically communicates content to particular enterprise networks 102 (often without request) upon receiving updated content 212. Vulnerability module 214 may be written in or based on any appropriate computer language including C, C++, Java, Visual Basic, Perl, and others. It will be understood that while vulnerability module 214 is illustrated as a single multi-tasked module, the features and functionality performed by these engine may be performed by multiple modules such as, for example, a component identification module, a remediation retrieval module, and a remediation transmission module. Moreover, while not illustrated, vulnerability module 214 may comprise a child module of another software application. Server 202 also includes interface 210 for communicating with other computer systems, such as remediation servers 108, over network 108 in a client-server or other distributed environment.

Content provider 204 typically comprises a vendor, a server, an entity, an individual, or other resource that provides content operable to identify and/or remediate vulnerabilities associated with an asset 106. For example, content provider 204a may comprise a vendor's web server that provides patches for the vendor's software. In another example, content provider 204a may comprise a Usenet group that provides a configuration setting script for updating a particular component. In summary, content providers 204 may comprise a vendor (e.g., Computer Associates, Microsoft, McAfee), a research or security firm, a Usenet group, an original equipment manufacturer, or any other suitable entity that provides content.

In one aspect of operation, a vulnerability of particular assets 106 and devices outside of enterprise network 102 is identified by content provider 204 or other vendor or entity outside of enterprise network 102. For example, a vendor may identify problems with the operation of an application running on the asset 102 such as a security flaw in a web browser. The vulnerability may be identified by customer complaints, a vendor's quality control department, a security research firm, or any other entity and/or individual. Once identified, content is generated to remediate or identify the vulnerability of asset 106 and provided to update the associated assets 106 at remote sites. In the vendor example, the vendor may generate a patch operable to fix the security flaw in the web browser and provide the patch on the vendor's website. In the illustrated embodiment, content provider 204 provides the content. Once available, content management server 202 requests and/or retrieves content from content providers 204, and vulnerability module 214 generates content 212 for transmission to enterprise networks 102a-c. In response to a content request 126, vulnerability module 214 identifies content 212 based on the request and transmits the identified request to the requesting enterprise network 102.

FIG. 3 illustrates an embodiment of a remediation task list 300 for managing remediations 120 associated with asset 106. Generally, remediation task list 200 provides a user with a view of various vulnerabilities and remediations 120 on a per asset basis. More specifically, remediation task list 300 provides presentation and control of all, substantially all, or at least a number of remediations 120 included in remediation task list 118. This presentation or control may be customized, filtered, or secured based on the particular user or user group. In one embodiment, the user can view remediations 120 in remediation task list 118 and manage the implementation of the displayed remediations 120. In certain situations, this may ease or automate the process of remediating vulnerabilities of assets 106 in enterprise network 102.

Remediation task list 300 includes a plurality of display elements such as remediation detail table 301 and remediation action field 318. Remediation detail table 301 and remediation action field 318 may be displayed in a single window or in their own window. Remediation detail table 301 may comprise a tabular display, including several rows and columns, with each intersection comprising a cell. Each cell is populated with information from remediation task list 118 and associated with an asset 106 in enterprise network 102. Each, as used herein, means every one of at least a subset of the identified items. In certain embodiments, remediation detail table 301 includes remediation profiles 302a-c. Remediation profiles 302a-c provide a display of information associated with a remediation 120. In the illustrated embodiment, remediation profiles 302a-c include the following fields: a check box 304 or other selectable graphic, a state 306, a rank 308, a remediation identification (ID) 310, a type 312, an associated content field 314, and assets groups 316. It will be understood that these fields are for illustration purposes only and that additional and/or different fields may be displayed. A remediation 120 may be selected, for example, by using a mouse and clicking on an associated check box 304 resulting in remediation 120 being transmitted to the associated asset 106. State 306 displays information indicating the state of a remediation 120 (e.g., open, in process). For example, a state 306 displaying "Open" indicates that remediation 120 may be selected, while "In Process" indicates that remediation 120 is already being processed by remediation server 108. Rank 308 indicates the impact or benefit of a remediation relative to other remediations to the overall security posture of the enterprise. Rank 308 is calculated based on the number and risk level of the vulnerabilities it addresses and the number and criticality of the affected assets. In short, the higher the rank 308, the higher the impact. Remediation ID 310 displays the ID of remediation 120, and type 312 indicates what type of entity provided the remediation 120. Associated content field 314 displays information indicating risk level of the vulnerability for each associated asset 106, and asset groups 316 displays the groups susceptible to the vulnerability associated with remediation 120. Once remediations 120 are selected, the user may then select an action to be performed with the selected remediations 120 via remediation action field 318. For example, a user may select to send remediations 120 to a software delivery queue using a drop down menu.

FIG. 4 illustrates an embodiment of a vulnerability remediation task detail 400 for managing a remediation 120 associated with at least one asset 106. Generally, remediation task detail 400 provides a user with a view of identified remediations 120 and/or associated assets 106 and asset groups. More specifically, remediation module 124 provides a display and control of a remediation 120 to the administrator available for the at least one asset 106 in enterprise network 102. In certain embodiments, the user can view groups associated with remediation 120 and manage the implementation of remediation 120 with the displayed groups. In certain situation, this display may ease or automate the process of remediating a vulnerability that effects a plurality of assets 106 in enterprise network 102.

Vulnerability remediation task detail 400 includes a plurality of display elements such as remediation table 402, a group tree 404, an action field 406, and a vulnerability table 414. These elements may be displayed in a single window or in their own window. Remediation table 402 may comprise, for example, a tabular display, including several rows and columns, with each intersection comprising a cell. Each cell is populated with information from remediation task list 118 and associated with assets 106 in enterprise network 102. In illustrated embodiment, remediation table 402 includes the following rows: a type 410, a rank 412, components 414, and implementation 416. Components 414 displays information indicating the components (e.g., operating system or application) affected by the vulnerability and implementation 416 displays information indicating how remediation 120 is implemented (e.g., executable or zip file). For example, the illustrated remediation 120 affects assets 106 executing or including Windows 2000 Advanced Server operating systems (with various service packs) and is implemented by visiting the highlighted URL. Group tree 404 illustrates a logical organization of groups associated with remediation 120 and may provide standard tree processing, such as collapsing or expanding. Each root node is associated with a group, which can be expanded to display individual assets 106 comprising the group. As a result, the administrator may select a group or an individual asset 106 in a group via, for example, a check box associated with the tree level. Once selected, the administrator may chose an action through action field 406 such as, for example, send remediation 120 to a software delivery queue for deployment to the selected group or asset 106. If the remediation includes software, then, once communicated to the appropriate asset 106, agent 110 automatically applies the patch or other software upgrade or installation usually without user intervention or even notification. If the remediation is a URL or manual fix, then the transmitted remediation 120 merely provides instructions to the user. Vulnerability table 414 may also comprise a tabular display, including several rows and columns, with each intersection comprising a cell. Each cell is populated with information associated with vulnerabilities that remediation 120 may fix, eliminate, or otherwise address. For example, vulnerability tree may include the following columns: vulnerability identification (Vuln ID), risk, and description.

The interfaces illustrated in FIGS. 3 and 4 are for illustration purposes only and may not represent actual interfaces. In addition, system 100 may provide interfaces with some, all, or different elements in different formats than those illustrated in FIGS. 3 and 4 without departing from the scope of this disclosure.

FIGS. 5A and 5B are an exemplary flow diagrams illustrating a method 500 and method 550 for remediating vulnerabilities in enterprise networks 102. Method 500 and 550 are described with respect to systems 100 and 200, but method 500 and 550 could also be used by any other systems. Moreover, these systems may use any other suitable techniques for performing these tasks. Thus, many of the steps in these flowcharts may take place simultaneously and/or in different orders as shown. Moreover, these systems may use methods with additional steps, fewer steps, and/or different steps, so long as the methods remain appropriate.

Method 500 is a flow diagram illustrating an example method for managing content for one or more enterprise networks 102. Method 500 begins at step 500 where content management server 202 identifies a vulnerability of one or more assets 106. Next, at step 504, content management server 202 retrieves information associated with the vulnerability from content providers 204. At step 506, content management server 202 generates content 212 for remediating the vulnerability of the associated assets 106. At step 508, content management server 202 receives a request for content 212 associated with one or more assets 106 from remediation server 108. In response to the request, content management server 202 identifies content 212 at step 510. Next, at step 512, content management server 202 transmits a response including content 212 to remediation server 108.

Method 550 is a flow diagram illustrating an example method for managing remediations in an enterprise network 102 Method 550 begins at step 552 where remediation server 108 transmits a request for content 212 associated with identified components and/or configuration settings associated with an asset 106. Next, at step 554, remediation server 108 receives a response including content 212 from content management server 202. If an asset profile 116 associated with asset 106 does not exist at decisional step 556, then, at step 558, inventory module 122 generates an associated asset profile 116. If an asset profile 116 associated with asset 106 does exist at decisional step 556, then, at step 560, inventory module 122 populates the associated asset profile 116 with at least a portion of the received information. Next, at step 562, remediation module 132 transmits a content request 126 to content management server 202. Vulnerability module 214 identifies content 212 based, at least in part, on content request 126 at step 564 and transmits the identified content 212 to remediation server 108 at step 566. If a remediation task list 118 associated with asset 106 does not exist at decisional step 568, then, at step 570, remediation module 124 generates a remediation task list 118. If a remediation task list 118 associated with asset 106 does exist at decisional step 568, then, at step 572, remediation module 124 generates remediation 120 and incorporates the generated remediation 120 in remediation task list 118. At step 574, remediation module 124 displays at least a portion of remediation task list 118 to a user. Next, at step 576, remediation module 124 receives a selection from the user identifying remediations of remediation task list 118. Once identified, remediation module 124 bundles the identified remediations 120 into a single executable at step 578 and transmits the executable to the associated asset 106 at step 580.

Although this disclosure has been described in terms of certain embodiments and generally associated methods, alternatives and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for managing remediations for a plurality of assets in an enterprise network, the system comprising:
    a remediation server configured to:
        receive asset information from at least one asset to be protected from the plurality of assets, the asset information including information associated with configuration settings of the at least one asset to be protected and information associated with one or more components of the at least one asset to be protected;
        generate an asset profile for the at least one asset to be protected, the asset profile including at least the received asset information for the at least one asset to be protected;
        transmit, to a content management server, a content request for content associated with one or more vulnerabilities of the plurality of assets in the enterprise network, wherein the content associated with the one or more vulnerabilities of the plurality of assets in the enterprise network is retrieved from one or more of a plurality of content providers that are external to the enterprise network;
        in response to the content request, receive, from the content management server, the content associated with the one or more vulnerabilities of the plurality of assets in the enterprise network;
        identify one or more vulnerabilities of the at least one asset to be protected by comparing the received asset information in the asset profile of the at least one asset to be protected to the received content from the content management server;
        identify one or more remediations for at least one of the identified one or more vulnerabilities of the at least one asset to be protected, wherein each of the one or more remediations includes at least particular content of the received content associated with the one or more vulnerabilities of the plurality of assets in the enterprise network, wherein the particular content is associated with an identified vulnerability of the at least one asset to be protected, and wherein the particular content is operable to remediate the at least one vulnerability; and
        generate a remediation task list associated with the at least one asset to be protected, the remediation task list including the one or more identified remediations.

2. The system of claim 1, wherein the received content is operable to remediate with the one or more identified vulnerabilities of the at least one asset to be protected.

3. The system of claim 2, wherein the received content is operable to update a configuration setting of the at least one asset to be protected.

4. The system of claim 2, wherein the received content is operable to update at least one of the one or more components of the at least one asset to be protected.

5. The system of claim 1, wherein the remediation server is further configured to:
receive, from the at least one asset to be protected, updated asset information associated with the configuration settings and the one or more components of the at least one asset to be protected;
update the asset profile associated with the at least one asset to be protected based on the received updated asset information; and
identify one or more vulnerabilities of the at least one asset to be protected based on comparing the received updated asset information in the updated asset profile to the received content from the content management server, the received content operable to update the at least one asset to be protected.

6. The system of claim 1, wherein the asset information associated with configuration settings and one or more components of the at least one asset to be protected is received from a hidden agent running on the at least one asset to be protected.

7. The system of claim 1, wherein the remediation server is further configured to:
transmit, to the content management server, a content request for content associated with one or more vulnerabilities of the at least one asset to be protected, wherein the remediation server retrieves the received asset information associated with the configuration settings and the one or more components of the at least one asset to be protected from the asset profile and includes the retrieved asset information in the content request; and
in response to the content request, receive, from the content management server, at least a portion of the retrieved content associated with the one or more vulnerabilities of at least one asset to be protected, wherein the portion of the retrieved content is identified for the at least one asset to be protected based on at least the retrieved asset information in the content request, and wherein the portion of the retrieved content is operable to remediate the one or more vulnerabilities of the at least one asset to be protected.

8. The system of claim 1, wherein the remediation server is further configured to:
determine whether the remediation task list exists for the at least one asset to be protected,
wherein the remediation task list is generated in response to a determination that the remediation task list does not exist.

9. The system of claim 1, wherein the received content from the content management server comprises one or more of a script, a release, a link, a patch, or a configuration setting.

10. The system of claim 1, wherein the content retrieved from the content providers comprises content retrieved from one or more of a vendor, a research security firm, a Usenet group, or an original equipment manufacturer.

11. The system of claim 1, wherein the remediation server is further configured to:
identify a plurality of assets communicably coupled with the enterprise network;
associate a subset of the plurality of assets as a group based on a subset of a plurality of asset characteristics;
identify one or more vulnerabilities associated with the group based on comparing the subset of asset characteristics to the received content; and
communicate the respective content to the group based on the one or more identified vulnerabilities.

12. An article of manufacture comprising a computer readable storage medium, the computer readable storage medium comprising software for remediation management, the software operable to:
transmit, by a remediation server to a content management server, a content request for content associated with one or more vulnerabilities of a plurality of assets in an enterprise network, wherein the content associated with the one or more vulnerabilities of the plurality of assets is retrieved from a plurality of content providers that are external to the enterprise network;
in response to the content request, receive at the remediation server from the content management server, the content associated with the one or more vulnerabilities of the plurality of assets in the enterprise network;
identify, at the remediation server, one or more vulnerabilities of at least one asset to be protected from the plurality of assets based on comparing an asset profile of the at least one asset to be protected to the received content from the content management server, the asset profile comprising asset information that includes information associated with configuration settings and information associated with one or more components of the at least one asset to be protected, the at least one asset to be protected communicably coupled to the enterprise network;
identify, at the remediation server, one or more remediations for at least one of the identified one or more vulnerabilities of the at least one asset to be protected, wherein each of the one or more remediations includes at least particular content of the received content associated with the one or more vulnerabilities of the plurality of assets in the enterprise network, wherein the particular content is associated with an identified vulnerability of the at least one asset to be protected, and wherein the particular content is operable to remediate the identified vulnerability;
generate, at the remediation server, a remediation task list associated with the at least one asset to be protected, the remediation task list including the one or more identified remediations; and
communicate, from the remediation server, the identified remediations to the at least one asset to be protected.

13. The article of manufacture of claim 12, wherein the software is further operable to update the at least one asset to be protected using the identified remediations while prohibiting end user intervention.

14. The article of manufacture of claim 13, wherein a configuration setting of the at least one asset to be protected is updated.

15. The software article of manufacture of claim 13, wherein firmware of at least one of the one or more components of the at least one asset to be protected is updated.

16. The article of manufacture of claim 12, wherein the software is further operable to update, at the remediation server, the asset profile of the at least one asset to be protected based on undated asset information associated with configuration settings and one or more components of the at least one asset to be protected that is received from the at least one asset to be protected.

17. The article of manufacture of claim 12, wherein the software is further operable to:
- display the remediation task list to an administrator; and
- in response to the administrator selecting the one or more identified remediations for the at least one asset to be protected, bundle the selected remediations into an update bundle;
- wherein the software operable to communicate the identified remediations comprises software operable to communicate the update bundle to the at least one asset to be protected; and
- the software is further operable to automatically update the at least one asset to be protected using the update bundle.

18. The article of manufacture of claim 13, wherein each remediation is associated with a risk level, and the software further operable to:
- identify a risk threshold associated with the at least one asset to be protected; and
- in response to a risk level of a remediation violating the risk threshold, update the at least one asset to be protected based on the remediation while prohibiting end user intervention.

19. The article of manufacture of claim 12, wherein the received content from the content management server comprises one or more of a script, a release, a link, a patch, or a configuration setting.

20. The article of manufacture of claim 12, wherein the content retrieved from the content providers comprises content retrieved from one or more of a vendor, a research security firm, a Usenet group, or an original equipment manufacturer.

21. The article of manufacture of claim 12, wherein the software is further operable to:
- identify a plurality of assets communicably coupled with the enterprise network;
- associate a subset of the plurality of assets as a group based on a subset of a plurality of asset characteristics;
- identify one or more vulnerabilities associated with the group based on comparing the subset of asset characteristics to the content; and
- communicate the respective content to the group based on the one or more identified vulnerabilities.

22. The article of manufacture of claim 12, wherein the software is further operable to:
- poll the content management server for content associated with the at least one asset to be protected at a configurable period of time; and
- update local content at the remediation server based on content identified at the content management server.

23. A method for remediation management, the method comprising:
- transmitting, by a remediation server to a content management server, a content request for content associated with one or more vulnerabilities of a plurality of assets in an enterprise network, wherein the content associated with the one or more vulnerabilities of the plurality of assets is retrieved from a plurality of content providers that are external to the enterprise network;
- in response to the content request, receiving at the remediation server from the content management server, the content associated with the one or more vulnerabilities of the plurality of assets in the enterprise network;
- identifying, at the remediation server, one or more vulnerabilities of at least one asset to be protected from the plurality of assets based on comparing an asset profile of the at least one asset to be protected to the received content from the content management server, the asset profile comprising asset information that includes information associated with configuration settings and information associated with one or more components of the at least one asset to be protected, the at least one asset to be protected communicably coupled to an enterprise network;
- identifying, at the remediation server, one or more remediations for at least one of the identified one or more vulnerabilities of the at least one asset to be protected, wherein each of the one or more remediations includes at least particular content of the received content associated with the one or more vulnerabilities of the of assets in the enterprise network, wherein the particular content is associated with an identified vulnerability of the at least one asset to be protected, and wherein the particular content is operable to remediate the identified vulnerability;
- generating at the remediation server, a remediation task list associated with the at least one asset to be protected, the remediation task list including the one or more identified remediations; and
- communicating, from the remediation server, the identified remediations to the at least one asset to be protected.

24. The method of claim 23, further comprising updating the at least one asset to be protected using the identified remediations while prohibiting end user intervention.

25. The method of claim 24, wherein a configuration setting of the at least one asset to be protected is updated.

26. The method of claim 24, wherein firmware of at least one of the one or more components of the at least one asset to be protected is updated.

27. The method of claim 23, further comprising updating, at the remediation server, the asset profile of the at least one asset to be protected based on updated asset information associated with configuration settings and one or more components of the at least one asset to be protected that is received from the at least one asset to be protected.

28. The method of claim 23, further comprising:
- displaying the remediation task list to an administrator; and
- in response to the administrator selecting the one or more identified remediations for the at least one asset to be protected, bundling the selected remediations into an update bundle;
- wherein communicating the identified remediations comprises communicating the update bundle to the at least one asset to be protected; and
- the method further comprising automatically updating the at least one asset to be protected using the update bundle.

29. The method of claim 24, wherein each remediation is associated with a risk level, and the method further comprising:
- identifying a risk threshold associated with the at least one asset to be protected; and
- in response to a risk level of a remediation violating the risk threshold, updating the at least one asset to be protected based on the remediation while prohibiting end user intervention.

30. The method of claim 23, wherein the received content from the content management server comprises one or more of a script, a release, a link, a patch, or a configuration setting.

31. The method of claim 23, wherein the content retrieved from the content providers comprises content retrieved from one or more of a vendor, a research security firm, a Usenet group, or an original equipment manufacturer.

32. The method of claim 23, further comprising:
- identifying a plurality of assets communicably coupled with the enterprise network;

associating a subset of the plurality of assets as a group based on a subset of a plurality of asset characteristics;

identifying one or more vulnerabilities associated with the group based on comparing the subset of asset characteristics to the content; and communicating the respective content to the group based on the one or more identified vulnerabilities.

33. The method of claim 22, further comprising:

polling the content management server for content associated with the at least one asset to be protected at a configurable period of time; and updating local content at the remediation server based on content identified at the content management server.

34. The system of claim 1, wherein the remediation server is further configured to:

receive a selection of at least one remediation from the identified one or more remediations in the remediation task list; and transmit the selected at least one remediation to the at least one asset to be protected.

* * * * *